United States Patent
Han et al.

(10) Patent No.: US 7,684,986 B2
(45) Date of Patent: Mar. 23, 2010

(54) METHOD, MEDIUM, AND APPARATUS RECOGNIZING SPEECH CONSIDERING SIMILARITY BETWEEN THE LENGTHS OF PHONEMES

(75) Inventors: Icksang Han, Yongin-si (KR); Sangbae Jeong, Suwon-si (KR); Jeongsu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1039 days.

(21) Appl. No.: 11/315,182

(22) Filed: Dec. 23, 2005

(65) Prior Publication Data

US 2006/0143010 A1    Jun. 29, 2006

(30) Foreign Application Priority Data

Dec. 23, 2004 (KR) .................. 10-2004-0111164

(51) Int. Cl.
*G10L 15/02* (2006.01)
*G10L 15/00* (2006.01)
*G10L 15/28* (2006.01)

(52) U.S. Cl. .................. 704/239; 704/231; 704/254; 704/255

(58) Field of Classification Search .......... None
See application file for complete search history.

(56) References Cited

U.S. PATENT DOCUMENTS 5,058,166 A * 10/1991 Ney et al. .................. 704/254
5,611,019 A * 3/1997 Nakatoh et al. ............ 704/233
5,857,173 A * 1/1999 Beard et al. ................ 704/276
5,864,809 A * 1/1999 Suzuki ....................... 704/254
2007/0192093 A1* 8/2007 Eskenazi .................... 704/231

FOREIGN PATENT DOCUMENTS

JP    11-311994    11/1999

OTHER PUBLICATIONS

Anastasakos, A. et al. "Duration modeling in large vocabulary speech recognition" ICASSP vol. 1, pp. 628-631, May 1995.*
Molloy, L. et al. "Suprasegmental duration modelling with elastic constraints in automatic speech recognition" ICSLP vol. 7, pp. 2975-2978, 1998.*
Nedel, J. et al. "Duration normalization for improved recognition of spontaneous and read speech via missing feature methods" ICASSP vol. 1, pp. 313-316, 2001.*
Ramachandrula, S. et al. "Connected phoneme HMMs with implicit duration modelling for better speech recognition" ICICS, Sep. 1997.*
Korean Patent Office Action in Related Korean Application No. 10-2004-0111164.

* cited by examiner

*Primary Examiner*—Matthew J Sked (57) ABSTRACT

An apparatus, medium, and method recognizing speech. The method may include the calculating of scores indicating the degree of similarity between a characteristic of an input speech and characteristics of speech models based on the degree of similarity between the length of each phoneme included in an input speech and the length of phonemes included in each speech model, and determining a speech model with the highest score among the scores to be the corresponding recognized speech for the input speech. By doing so, the speech recognition rate may be greatly enhanced and when an input speech includes continuous identical phonemes the word error rate (WER) may be greatly reduced.

26 Claims, 7 Drawing Sheets

| ALGORITHM | RECOGNITION RATE | WER |
|---|---|---|
| CONVENTIONAL TECHNOLOGY | 62.6% | - |
| PRESENT EMBODIMENT | 70.2% | -20.4% | ns
METHOD, MEDIUM, AND APPARATUS RECOGNIZING SPEECH CONSIDERING SIMILARITY BETWEEN THE LENGTHS OF PHONEMES

CROSS-REFERENCE TO RELATED APPLICATIONS

This application claims the priority benefit of Korean Patent Application No. 10-2004-0111164, filed on Dec. 23, 2004, in the Korean Intellectual Property Office, the disclosure of which is incorporated herein in its entirety by reference.

BACKGROUND OF THE INVENTION

1. Field of the Invention

Embodiments of the present invention discussed herein relate to a speech recognition apparatus, medium, and method, and more particularly, to a method, medium, and apparatus recognizing speech based on a hidden Markov model (HMM).

2. Description of the Related Art

Most of recent speech recognition technologies are based on the HMM model developed by International Business Machines (IBM). The HMM model is obtained through statistically modeling a speech unit, that is, a phoneme or a syllable. The conventional speech recognition technologies based on the HMM model use a Mel frequency Cepstral coefficient (MFCC), but there is a problem with this approach in that if only these MFCC coefficients are used it is difficult to distinguish identical phonemes or identical syllables.

Among the conventional speech recognition technologies, there is also technique of recognizing speech by using an absolute length of a phoneme. However, because this technique uses an absolute length of phonemes, the technique cannot properly respond to the speech speed of a speaker.

SUMMARY OF THE INVENTION

Embodiments of the present invention provide speech recognition methods, media, and apparatuses capable of identifying whether identical phonemes or identical syllables have been repeated, and capable of flexibly responding to the speech speed of a speaker.

To achieve the above and/or other aspects and advantages, embodiments of the present invention include a speech recognition method, including calculating scores indicating a degree of similarity between a characteristic of an input speech and characteristics of speech models, of a plurality of speech models, based on a degree of similarity between lengths of phonemes included in the input speech and lengths of phonemes included in the speech models, and indicating a speech model having a high score among the calculated scores as being a speech model matching the input speech.

The high score may be a highest score among the calculated scores.

The method may further include calculating the scores by using the characteristic of the input speech and each corresponding characteristic of the speech models, wherein, in the calculating of the scores indicating the degree of similarity, the calculated scores are re-calculated by using the calculated scores as calculated by using the characteristic of the input speech and each of the corresponding characteristics.

In the calculating of the scores indicating the degree of similarity, if among candidate speeches having a score higher than a predetermined rank among the scores calculated by using the characteristic of the input speech and each of the corresponding characteristics, some candidate speeches have continuous identical phonemes, the calculated scores may be re-calculated based on a degree of similarity of a length of each phoneme included in the input speech with a length of phonemes included in each candidate speech.

Here, in the calculating of the scores by using the characteristic of the input speech and each of the corresponding characteristics, the scores may be calculated based on a hidden Markov model (HMM).

The method may further include extracting a characteristic vector having Mel Frequency Cepstral Coefficients (MFCC) of the input speech as components, wherein in the calculating of the scores by using the characteristic of the input speech and each of the corresponding characteristics, the scores are calculated by using the characteristic vector of the input speech and a characteristic vector for each of the speech models.

If the input speech is a numbering speech, in the calculating of the scores indicating the degree of similarity, scores indicating the degree of similarity between the characteristic of an input speech and the characteristics of the speech models may be alternatively calculated based on a degree of similarity between lengths of syllables included in the input speech and lengths of syllables included in the speech models.

To achieve the above and/or other aspects and advantages, embodiments of the present invention include a speech recognition apparatus, including a score calculation unit to calculate scores indicating a degree of similarity between a characteristic of an input speech and characteristics of speech models, of a plurality of speech models, based on a degree of similarity between lengths of phonemes included in the input speech and lengths of phonemes included in the speech models, and a recognized speech calculation unit to identify a speech model having a high score among the calculated scores as a speech model matching the input speech.

To achieve the above and/or other aspects and advantages, embodiments of the present invention include a medium including computer readable code to implement a speech recognition method, wherein the speech recognition method includes calculating scores indicating a degree of similarity between a characteristic of an input speech and characteristics of speech models, of a plurality of speech models, based on a degree of similarity between lengths of phonemes included in the input speech and lengths of phonemes included in the speech models, and indicating a speech model, of the plurality of speech models, having a high score among the calculated scores as being a speech model matching the input speech.

To achieve the above and/or other aspects and advantages, embodiments of the present invention include a method for calculating a score, including calculating correlation coefficients indicating a degree of similarity between lengths of phonemes included in an input speech and lengths of phonemes included in candidate speeches, of a plurality of candidate speeches, and calculating and outputting scores indicating a degree of similarity of a characteristic of the input speech and characteristics of the candidate speeches based on the calculated correlation coefficients.

In the calculating of the correlation coefficients, the correlation coefficients may be calculated by referring to context information before and after each phoneme included in the input speech.

In the calculating of the scores indicating the degree of similarity, the scores may be calculated based on weights, which are based on a test result of the scores, together with the correlation coefficients. In addition, in the calculating of the scores indicating the degree of similarity, scores may be calculated by adding a score based on a HMM model and a product of a weight of the score based on the HMM model and a difference between a predetermined value and a correlation coefficient.

In the calculating of the correlation coefficients, the correlation coefficients may be calculated based on lengths of all phonemes included in the input speech and lengths of all phonemes in each of the candidate speeches.

Further, in the calculating of the correlation coefficients, the correlation coefficients may be calculated based on lengths of a core phoneme included in the input speech and a phoneme before the core phoneme, and lengths of continuous identical phonemes included in part of the candidate speeches and a phoneme before the continuous identical phonemes, with the core phoneme being a phoneme presumed to be identical to the continuous identical phonemes.

Still further, in the calculating of the correlation coefficients, the correlation coefficients may be calculated based on lengths of a core phoneme included in the input speech and a phoneme after the core phoneme, and lengths of continuous identical phonemes included in part of the candidate speeches and a phoneme after the continuous identical phonemes, with the core phoneme being a phoneme presumed to be identical to the continuous identical phonemes.

In the calculating of the correlation coefficients, the correlation coefficients may still further be calculated based on lengths of a core phoneme included in the input speech and phonemes before and after the core phoneme, and lengths of continuous identical phonemes included in part of the candidate speeches and phonemes before and after the continuous identical phonemes, with the core phoneme being a phoneme presumed to be identical to the continuous identical phonemes.

The correlation coefficient may be normalized correlation coefficient of a length vector having lengths of respective phonemes included in the input speech, as components, and length vectors having lengths of respective phonemes included in each of the candidate speeches, as components, and a normalized correlation calculation unit calculates the normalized correlation coefficient by dividing a scalar product of the length vector of the input speech and a length vector of each candidate speech by a product of a length vector size of the input speech and a length vector size of each candidate speech.

If the input speech is a numbering speech, in the calculating of the correlation coefficients the correlation coefficients may alternatively indicate a degree of similarity of lengths of syllables included in the input speech and lengths of syllables included in the candidate speeches.

To achieve the above and/or other aspects and advantages, embodiments of the present invention include an apparatus for calculating a score including a correlation coefficient calculation unit to calculate correlation coefficients indicating a degree of similarity between lengths of phonemes included in an input speech and lengths of phonemes included in candidate speeches, of a plurality of speeches, and a score calculation unit to calculate scores indicating a degree of similarity of a characteristic of the input speech and characteristics of the candidate speeches based on the calculated correlation coefficients.

To achieve the above and/or other aspects and advantages, embodiments of the present invention include a medium including computer readable code to implement a score calculation method, wherein the score calculation method includes calculating correlation coefficients indicating a degree of similarity between lengths of phonemes included in an input speech and lengths of phonemes included in candidate speeches, of a plurality of candidate speeches, and calculating and outputting scores indicating a degree of similarity of a characteristic of the input speech and characteristics of the candidate speeches based on the calculated correlation coefficients.

To achieve the above and/or other aspects and advantages, embodiments of the present invention include a speech recognition apparatus, including a score calculation unit to implement the method according to an embodiment of the present invention to calculate scores for speech models, of a plurality of speech models, and a recognized speech calculation unit to identify a speech model having a high score among the calculated scores as a speech model matching an input speech.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
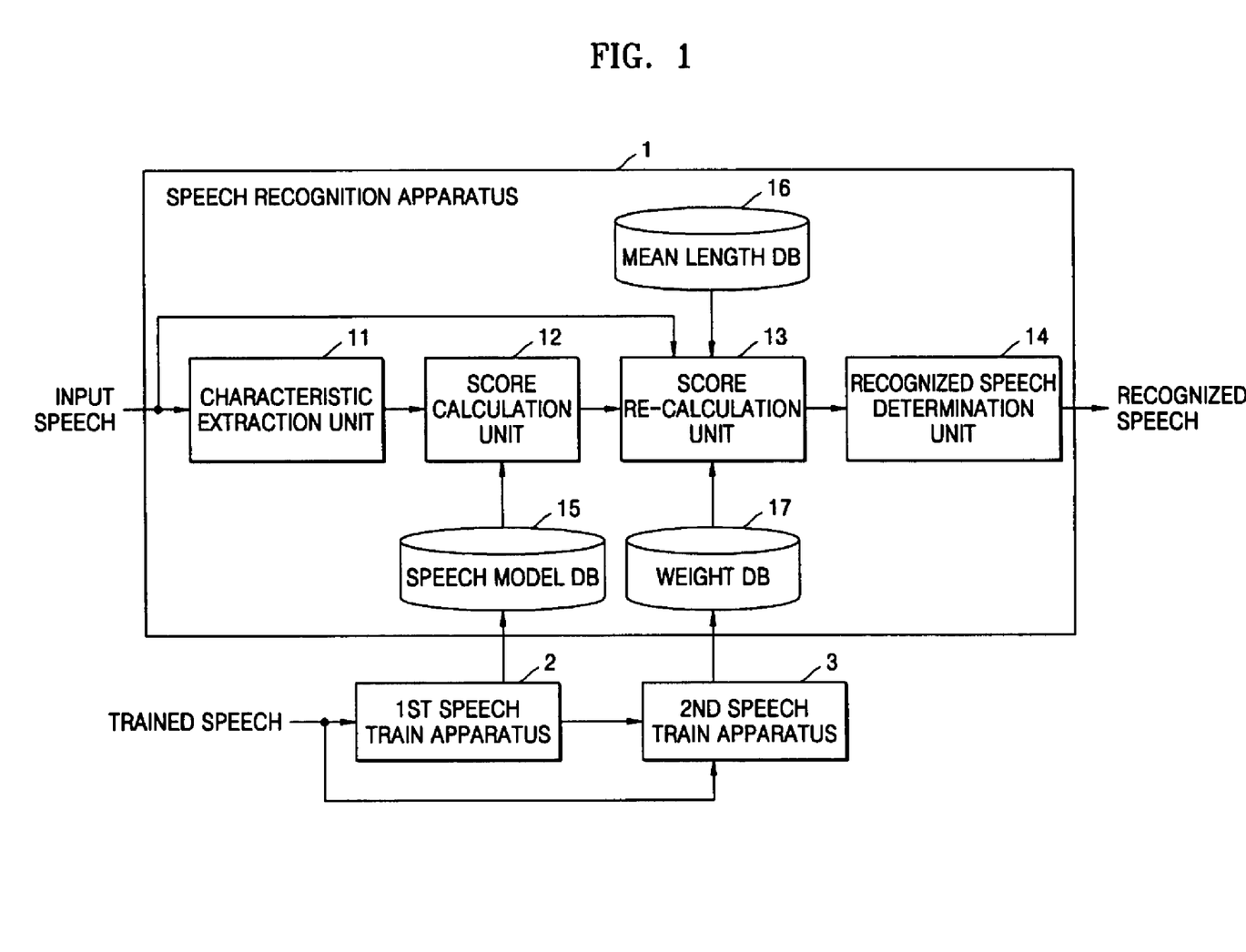
FIG. 1 illustrates a speech recognition system, according to an embodiment of the present invention.

Referring to FIG. 1, a speech recognition system, according to an embodiment of the present invention, may include a speech recognition apparatus 1, a first speech train apparatus 2, and a second speech train apparatus 3, for example. Generally, the speech recognition apparatus 1 may be mounted on/with a product having a speech recognition capability, e.g., a mobile phone, and the first speech train apparatus 2 and the second speech train apparatus 3 may be mounted on devices used during the manufacturing of products having such speech recognition capabilities, noting that additional embodiments are equally available.

The speech recognition apparatus 1 may be formed with a characteristic extraction unit 11, a score calculation unit 12, a score re-calculation unit 13, a recognized speech calculation unit 14, a speech model database 15, a mean length database 16, and a weight database 17, for example.

The characteristic extraction unit 11 may extract a characteristic vector having MFCC coefficients as components. Here, MFCC coefficients are obtained by modeling the characteristic of frequencies in the ear of a human being. To obtain the MFCC coefficients, an input speech is converted into a digital signal, and this digital signal is fast Fourier transformed (FFT). The signals converted into the frequency domain by this FFT transform are divided into a plurality of filter banks, and the logarithm of the energy in each of the banks is obtained, and the logarithms are discrete cosine transformed (DCT). As a result, the MFCC coefficients may be obtained.

The speech model database 15 may be generated by the first speech train apparatus 2.

In this case, the first speech train apparatus 2 would generate speech models by using a large amount of training speeches based on the HMM model. More specifically, the first speech train apparatus 2 may collect a large amount of training speeches from a plurality of speakers, e.g., according to a method suggested by the HMM model, and through the training process, using these training speeches, generate speech models that are statistical probability models of phoneme or syllable units.

The score calculation unit 12 may calculate scores, e.g., according to a method suggested by the HMM model, by using the characteristic vector of an input speech extracted by the characteristic extraction unit 11 and the characteristic vector of each of speech models stored in the speech model database 15.

If among candidate speeches having a score higher than a predetermined rank, among scores calculated by the score calculation unit 12, some of these candidate speeches have continuous identical phonemes and in the input speech there is no silent interval equal to or greater than a threshold, the score re-calculation unit 13 may re-calculate scores based on the degree of similarity in the length of each phoneme included in the input speech with the length of phonemes included in each candidate speech. Here, consideration of the input speech having no silent interval equal to or greater than a threshold is considered to distinguish whether the input speech is a single speech or plural speeches.

However, when the input speech is a numbering speech, syllables may be used instead of phonemes, with the same principles applying. In this case, if among candidate speeches having a higher score than a predetermined rank, among scores calculated by the score calculation unit 12, some of these candidate speeches have continuous identical syllables and in the input speech there is no silent interval equal to or greater than a threshold, the score re-calculation unit 13 may re-calculate scores based on the degree of similarity in the length of each syllable included in the input speech with the length of syllables included in each candidate speech.

For example, if any one of 2 candidate speeches, having the first and second highest scores among the scores calculated by the score calculation unit 12, has continuous identical phonemes, and in the input speech there is no silent interval equal to or greater than a threshold, the score re-calculation unit 13 may re-calculate scores based on the degree of similarity of the length of each of the phonemes included in the input speech with the length of phonemes included in each of the 2 candidate speeches.

Figure 2:
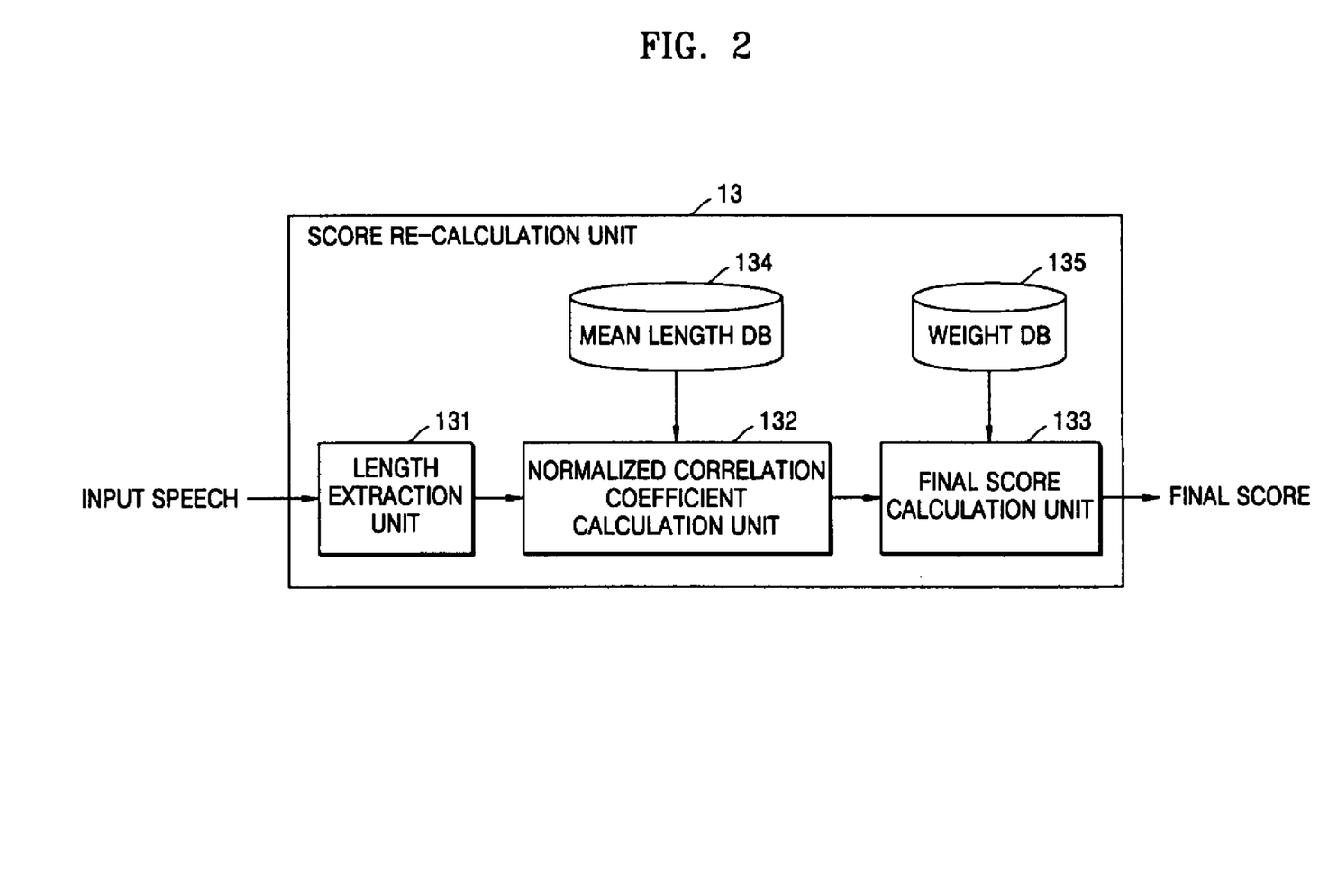
FIG. 2 illustrates a score re-calculation unit, such as the score re-calculation unit 13 shown in FIG. 1, according to an embodiment of the present invention.

FIG. 2 illustrates a score re-calculation unit 13, such as that shown in FIG. 1, according to an embodiment of the present invention.

Referring to FIG. 2, the score re-calculation unit 13 may include a length extraction unit 131, a normalized correlation coefficient calculation unit 132, a final score calculation unit 133, a mean length database 134, and a weight database 135, for example.

The length extraction unit 131 can extract the length of each of the phonemes included in the input speech. However, if the input speech is a numbering speech, the length extraction unit 131 may extract the length of each of the syllables included in the input speech. The length extraction unit 131 may then arrange the MFCC coefficient values of the input speech by using a viterbi algorithm, for example, and by detecting the length of a speech model interval obtained according to this arrangement, can extract the length of each of the phonemes included in the input speech.

The normalized correlation coefficient calculation unit 32 may calculate normalized correlation coefficients that indicate the degree of similarity of the length of each of the phonemes included in the input speech with the mean length of each phoneme included in each candidate speech. The mean length of each phoneme included in each candidate speech may be stored in the mean length database 134. This mean length database 134 may be built by collecting a large amount of training speeches spoken by a plurality of speakers, and recording mean values of phonemes with a variety of lengths included in each of the training speeches. However, if the input speech is a numbering speech, the normalized correlation coefficient calculation unit 32 may calculate normalized correlation coefficients that indicate the degree of similarity of the length of each of the syllables included in the input speech with the mean length of each syllable included in each candidate speech. The mean length of each syllable included in each candidate speech may be stored in the mean length database 134.

The normalized correlation coefficient (NCC) may be obtained by expressing the correlation between two variable amounts in number and then normalizing the number. Generally, the normalized correlation coefficient may be calculated by using the following equation 1:

$$NCC = \{x(u1)y(u1) + x(u2)y(u2) + \ldots + x(uL)y(uL)\} \text{over} \{SQRT\{x(u1)x(u2)\ldots x(uL)\}SQRT\{y(u1)y(u2)\ldots y(uL)\}\} \quad (1)$$

Here, x denotes a vector having the length of each of the phonemes included in the input speech, and y denotes a vector having the length of each phoneme included in each candidate speech. However, if the input speech is a number speech, x denotes a vector having the length of each of the syllables included in the input speech, and y denotes a vector having the length of each syllables included in each candidate speech.

That is, the normalized correlation coefficient calculation unit 132 may calculate a normalized correlation coefficient by dividing the scalar product of the length vector of the input speech and the length vector of each candidate speech by the product of the length vector size of the input speech and the length vector size of each candidate speech. Here, the length vector of the input speech may be a vector having the length of each phoneme included in the input speech, as its component, and the length vector of each candidate speech may be a vector having the length of each phoneme included in each candidate speech, as its component. However, if the input speech is a numbering speech, the length vector of the input speech may be a vector having the length of each syllable included in the input speech, as its component, and the length vector of each candidate speech may be a vector having the length of each syllable included in each candidate speech, as its component.

Figure 3:
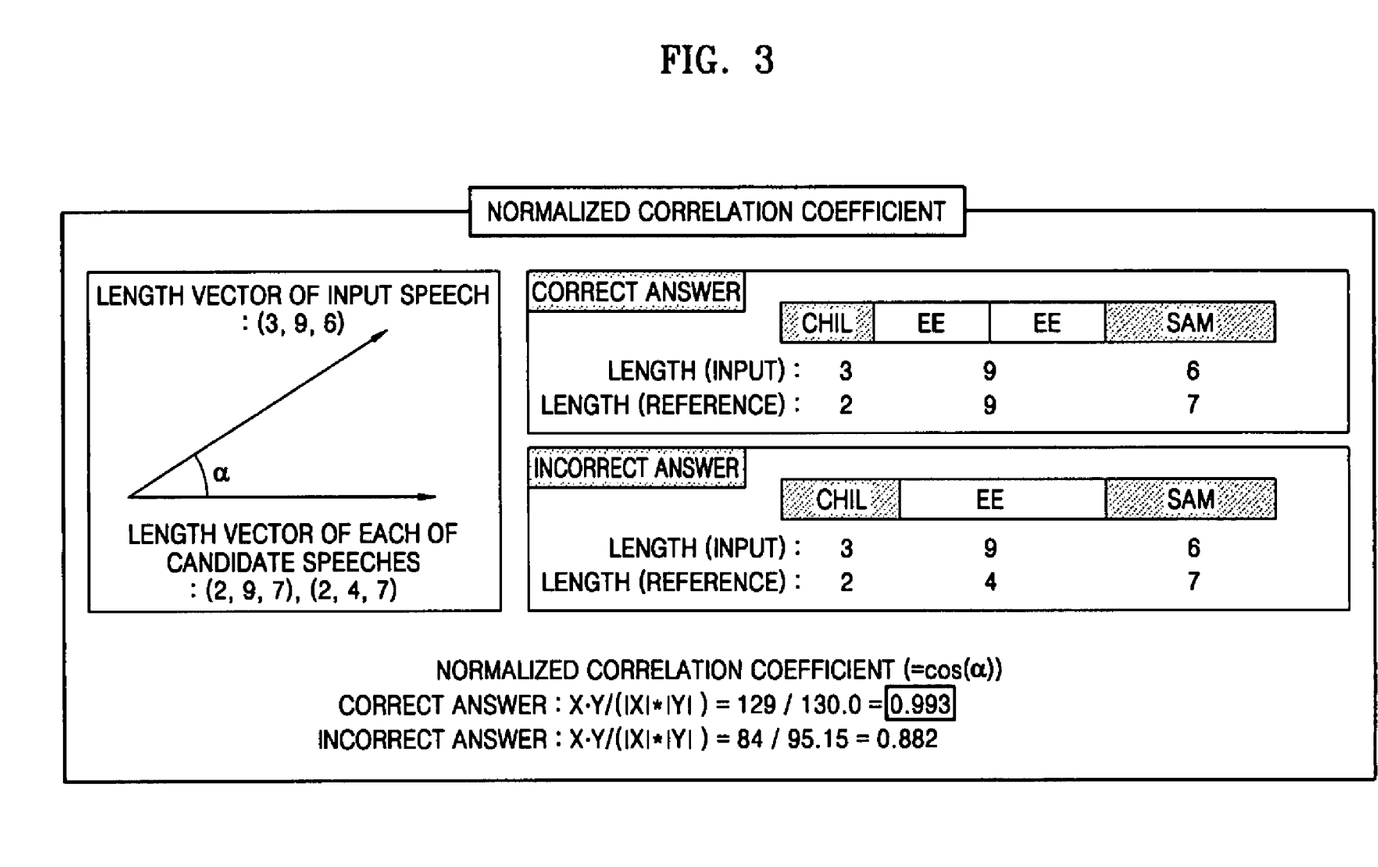
FIG. 3 illustrates the calculating of a normalized correlation coefficient, according to an embodiment of the present invention.

FIG. 3 illustrates a normalized correlation coefficient, according to an embodiment of the present invention. Referring to FIG. 3, the length vector of the input speech is (3, 9, 6) and the length vectors of 2 candidate speeches are (2, 9, 7) and (2, 4, 7), respectively. Here, (2, 9, 7) is the mean length vector of "chil ee ee sam (7 2 2 3)" and (2, 4, 7) is the mean length vector of "chil ee sam (7 2 3)".

The normalized correlation coefficient calculation unit 132 can calculate the normalized correlation coefficient by plugging the component values of the length vector of the input speech and the component values of the length vector of each candidate speech in the equation 1. From FIG. 3, it can be seen that the normalized correlation coefficient is a cosine value of the angle formed by the length vector of an input speech and the length vector of a candidate speech.

The normalized correlation coefficient of length vector (3, 9, 6) of the input speech and length vector (2, 9, 7) of any one candidate speech is 0.993, and the normalized correlation coefficient of length vector (3, 9, 6) of the input speech and length vector (2, 4, 7) of the other candidate speech is 0.882. From this result, it can be determined that the input speech is closer to "chil ee ee sam" than to "chil ee sam". The test result performed by using a large amount of train speeches indicates that, generally, according to an embodiment of the present invention, correct answers have correlation coefficients mostly 0.95 or greater, and incorrect answers usually have correlation coefficients below 0.95.

In order to more accurately calculate a normalized correlation coefficient, the normalized correlation coefficient calculation unit 132 can calculate a normalized correlation coefficient by referring to context information before and after each phoneme included in the input speech. However, if the input speech is a numbering speech, the normalized correlation coefficient calculation unit 132 can calculate a normalized correlation coefficient by referring to context information before and after each syllable included in the input speech.

For example, if the input speech is "chil ee sam", the normalized correlation coefficient calculation unit 132 can also calculate the normalized correlation coefficient without referring to context information before and after each phoneme included in "chil ee sam", that is, "chil", "ee", and "sam". Here, the normalized correlation coefficient calculation unit 132 can, thus, calculate the normalized correlation coefficient without distinguishing a case where each of "chil", "ee", and "sam" is independently spoken, from a case where "chil ee sam" are continuously spoken.

However, when independently spoken "chil", "ee", and "sam" is compared with continuously spoken "chil ee sam", the length of each of the syllables included in the input speech is different. This is caused by a spoken phenomenon of the length of each of syllables included in an input speech varying with respect to which context is arranged before and after the syllable. That is, when an independently spoken "chil" is compared with a spoken "silent–chil+ee", the length of "chil" is different in each case. Also, when independently spoken "ee" is compared with continuously spoken "chil–ee+sam", the length of "ee" is different in each case. Likewise, when an independently spoken "sam" is compared with a continuously spoken "ee–sam+silent", the length of "sam" is different.

The normalized correlation coefficient calculation unit 132 can calculate normalized correlation coefficients in a variety of ways. Generally, when a method requiring a greater amount of computation is selected, a more accurate normalized correlation coefficient may be obtained, but a speck recognition system designer should also consider the specification of a speech recognition system desired to be implemented.

The normalized correlation coefficient calculation unit 132 may calculate normalized correlation coefficients by using the lengths of all phonemes included in an input speech and the lengths of all phonemes included in each candidate speech. However, if the input speech is numbering speech, the normalized correlation coefficient calculation unit 132 may calculate normalized correlation coefficients by using the lengths of all syllables included in the input speech and the lengths of all syllables included in each candidate speech.

In addition, the normalized correlation coefficient calculation unit 132 may calculate normalized correlation coefficients by using the lengths of a core phoneme and the phoneme before the core phoneme included in the input speech, and the lengths of continuous identical phonemes included in part of candidate speeches and the phoneme before the continuous identical phonemes. Here, and hereinafter, the core phoneme should be interpreted to mean a phoneme presumed to be identical to the continuous identical phonemes. However, if the input speech is a numbering speech, the normalized correlation coefficient calculation unit 132 may calculate normalized correlation coefficients by using the lengths of a core syllable and the syllable before the core syllable included in the input speech, and the lengths of continuous identical syllables included in part of candidate speeches and the syllable before the continuous identical syllables.

Further, the normalized correlation coefficient calculation unit 132 may calculate normalized correlation coefficients by using the lengths of a core phoneme and the phoneme after the core phoneme included in the input speech, and the lengths of continuous identical phonemes included in part of candidate speeches and the phoneme after the continuous identical phonemes. However, if the input speech is a numbering speech, the normalized correlation coefficient calculation unit 132 may calculate normalized correlation coefficients by using the lengths of a core syllable and the syllable after the core syllable included in the input speech, and the lengths of continuous identical syllables included in part of candidate speeches and the syllable after the continuous identical syllables.

Still further, the normalized correlation coefficient calculation unit 132 may calculate normalized correlation coefficients by using the lengths of a core phoneme and the phonemes before and after the core phoneme included in the input speech, and the lengths of continuous identical phonemes included in part of candidate speeches and the phoneme before and after the continuous identical phonemes. However, if the input speech is a numbering speech, the normalized correlation coefficient calculation unit 132 may calculate normalized correlation coefficients by using the lengths of a core syllable and the syllable before and after the core syllable included in the input speech, and the lengths of continuous identical syllables included in part of candidate speeches and the syllable before and after the continuous identical syllables.

The final score calculation unit 133 may calculate final scores by using the normalized correlation coefficients, calculated by the normalized correlation coefficient calculation unit 132, and weights stored in the weight database 135, for example. According to an embodiment of the present invention, the final score calculation unit 133 may calculate final scores by using the following equation 2:

Final score=$S+W \times S \times (1-NCC)$ (2)

Here, S denotes a score calculated by the score calculation unit 12, e.g., a score based on the HMM model, and W denotes a weight.

That is, the final score calculation unit 132 may calculate a final score by adding a score based on the HMM model and the product of a weight of the score based on the HMM model and the difference between 1 and the normalized correlation coefficient. Here, the weight may be a value determined based on test results of final scores, and the weight database 135 may be generated by the second speech train apparatus 3, for example.

Figure 4:
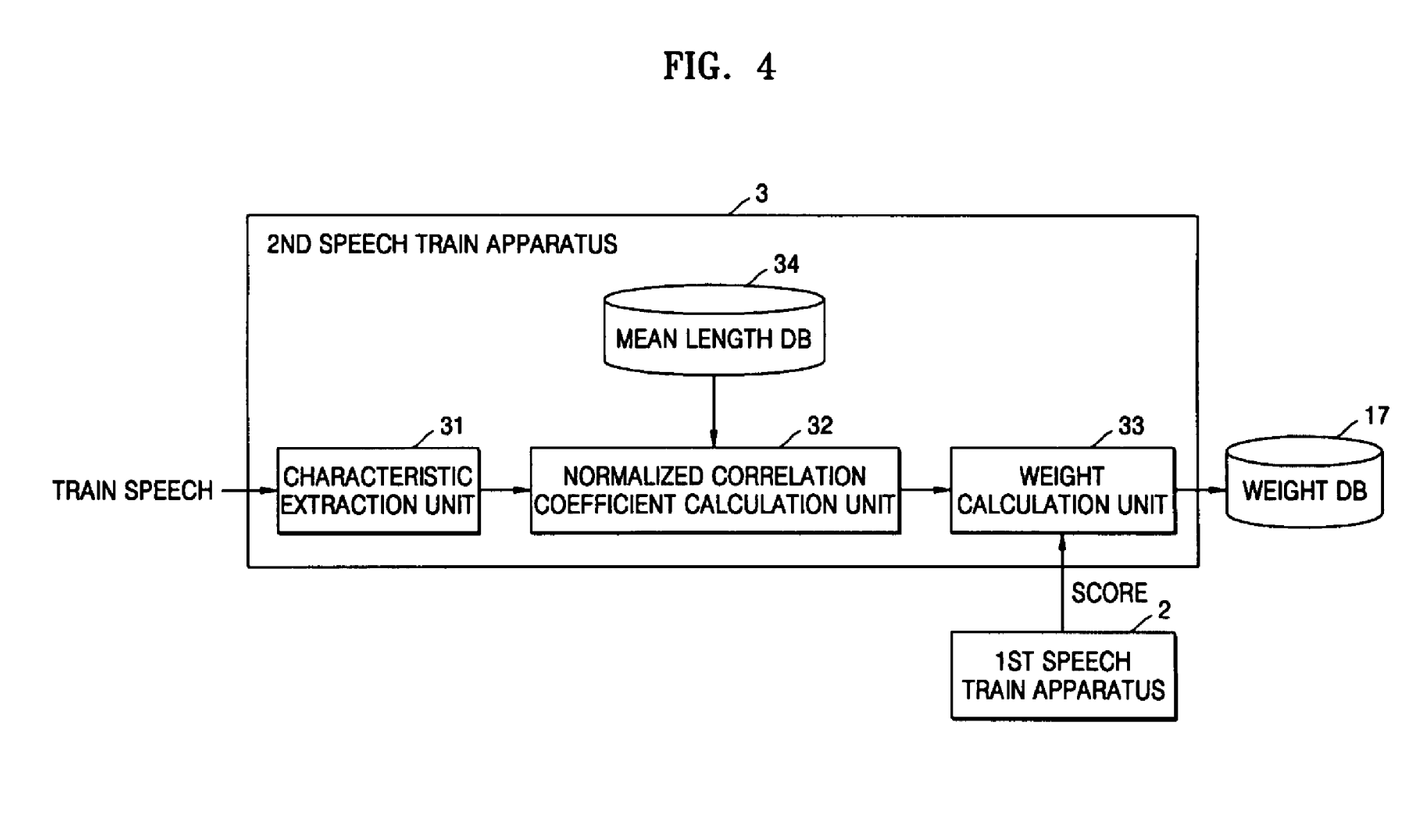
FIG. 4 illustrates a second speech train apparatus, such as the speech train apparatus shown in FIG. 1, according to an embodiment of the present invention.

FIG. 4 illustrates a second speech train apparatus 3, such as that shown in FIG. 1, according to an embodiment of the present invention.

Referring to FIG. 4, the second speech train apparatus 3 may include a length extraction unit 31, a normalized correlation coefficient calculation unit 32, a weight calculation unit 33, and a mean length database 34, for example.

The length extraction unit 31 may perform a similar operation as that of the length extraction unit 131 of the score re-calculation unit 13. That is, the length extraction unit 31 may extract the length of each phoneme included in the training speeches. However, if the training speech is a numbering speech, the length extraction unit 31 may extract the length of each syllable included in the training speeches.

The normalized correlation coefficient calculation unit 32 may perform a similar operation as that of the normalized correlation calculation unit 132 of the score re-calculation unit 13. That is, the normalized correlation coefficient calculation unit 32 may calculate normalized correlation coefficients indicating the degree of similarity of the length of each phoneme extracted by the length extraction unit and the mean length of each phoneme stored in the mean length database 34. However, if the input speech is a numbering speech, the normalized correlation coefficient calculation unit 32 may calculate normalized correlation coefficients indicating the degree of similarity of the length of each syllable included in train speeches and the mean length of each syllable stored in the mean length database 34.

The weight calculation unit 33 may calculate weights by using the normalized correlation coefficient calculated by the normalized correlation coefficient calculation unit 32 and the score calculated by a first speech train apparatus 2, e.g., the score based on the HMM model. A person who wants to design a speech recognition system, such as that shown in FIG. 1, may determine a final score most appropriate to the training speeches, in advance, by considering the phonemes included in training speeches and their combination types. Thus, the weight calculation unit 33 may calculate weights by plugging the previously determined final score in the equation 2.

Referring again to FIG. 1, the recognized speech determination unit 14 may determine that a speech model having the highest score among scores calculated by the score calculation unit 12 and the score re-calculation unit 13 is the recognized speech for the input speech.

Figure 5:
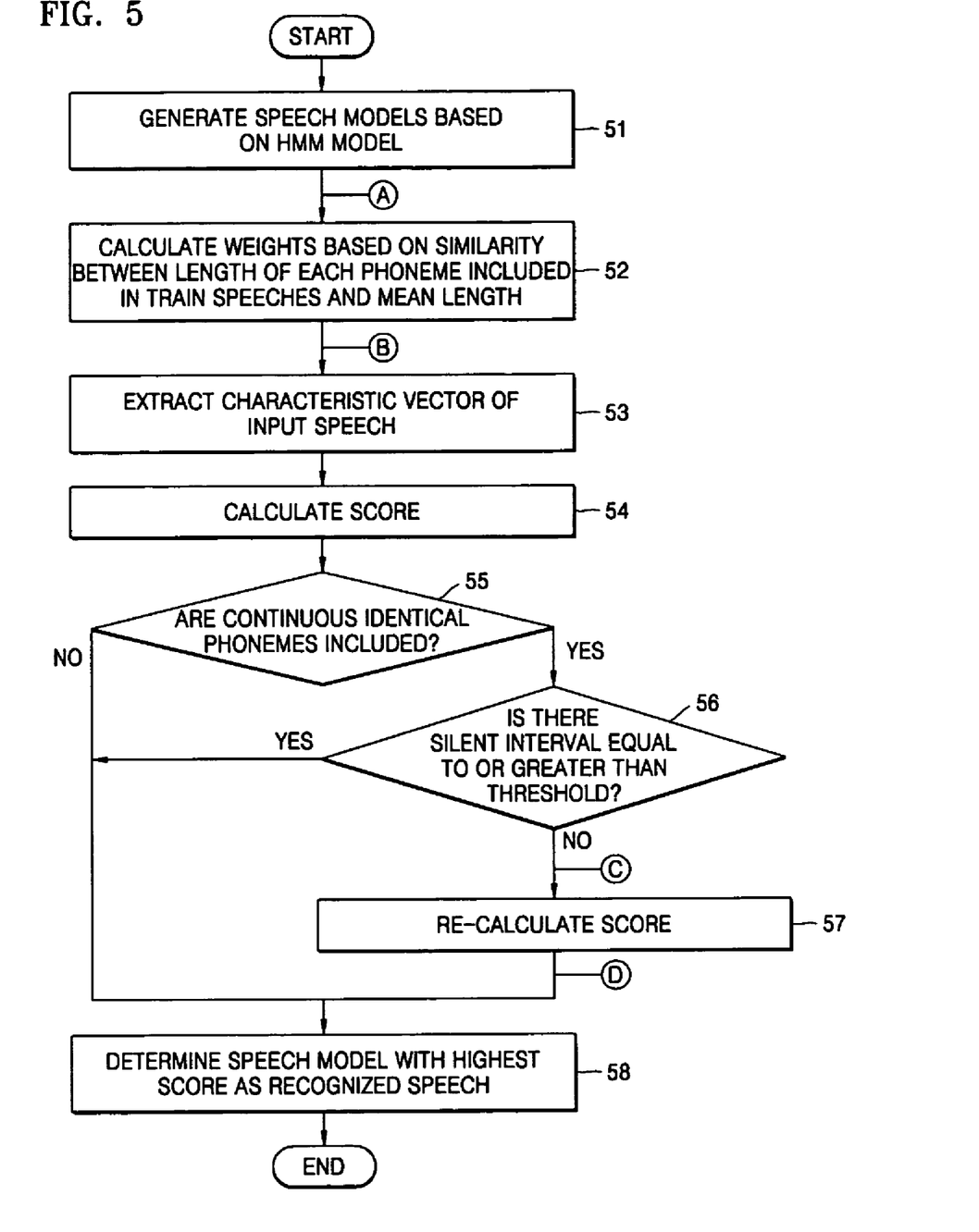
FIG. 5 illustrates a speech recognition method, according to an embodiment of the present invention.

FIG. 5 illustrates a speech recognition method, according to an embodiment of the present invention.

Referring to FIG. 5, operations of the speech recognition method may be performed in a series of time slots in a speech recognition system, such as that shown in FIG. 1. Accordingly, the above discussion for the speech recognition system of FIG. 1 is also applicable to the present speech recognition method.

In operation 51, the speech recognition system may generate speech models based on the HMM model by using a large amount of training speeches.

In operation 52, the speech recognition system may calculate weights to obtain scores most appropriate to training speeches based on the degree of similarity between the length of each of phonemes included in the large number of training speeches and the mean length of each phoneme. However, if the training speeches are numbering speeches, the speech recognition system may calculate weights to obtain scores most appropriate to training speeches based on the degree of similarity between the length of each of syllables included in the large number of training speeches and the mean length of each syllable.

Figure 6:
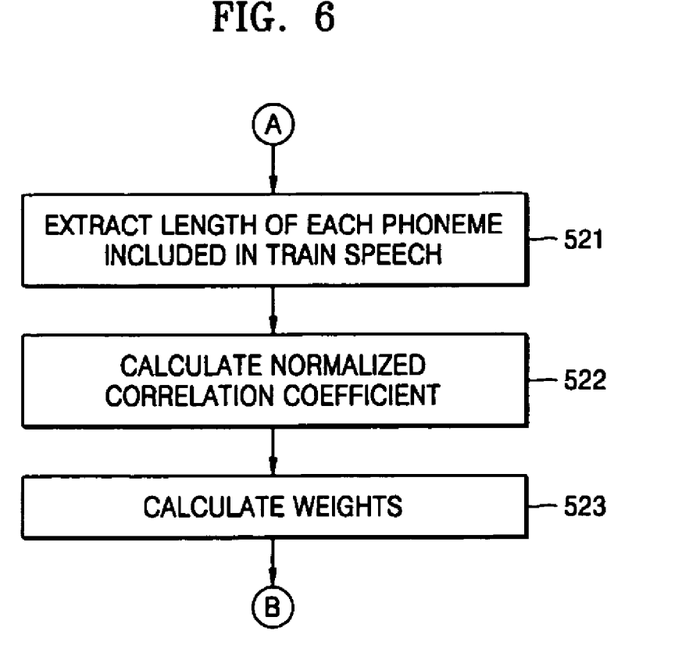
FIG. 6 illustrates operation 52 shown in FIG. 5, according to an embodiment of the present invention.

FIG. 6 illustrates operation 52 shown in FIG. 5, according to an embodiment of the present invention.

Here, in operation 521, the speech recognition system may extract the length of each of the phonemes included in the training speeches. However, if the training speech is a numbering speech, the speech recognition system may extract the length of each of syllables included in the training speeches.

In operation 522, the speech recognition system may calculate normalized correlation coefficients indicating the degree of similarity of the length of each phoneme extracted in the operation 521 and the mean length of each of these phonemes. However, if the input speech is a numbering speech, the speech recognition system calculates normalized correlation coefficients indicating the degree of similarity of the length of each syllable extracted in the operation 521 and the mean length of each of these syllables.

In operation 523, the speech recognition system may calculate weights by using the normalized correlation coefficient calculated in the operation 522 and the score calculated in the operation 51, e.g., the score based on the HMM model.

Referring again to FIG. 5, in operation 53, the speech recognition system may extract a characteristic vector having the MFCC coefficients of the input speech as its components.

In operation 54, the speech recognition system may calculate scores according to the method suggested by the HMM model, for example, by using the characteristic vector of the input speech extracted in the operation 53 and each characteristic vector of the speech models generated in the operation 51, for example.

In operation 55, the speech recognition system may determine whether part of the candidate speeches, calculated in the operation 54 and having a higher score than a predetermined rank, include continuous identical phonemes. However, if the input speech is a numbering speech, the speech recognition system may determine whether part of the candidate speeches, calculated in the operation 54 and having a higher score than a predetermined rank, include continuous identical syllables.

If it is determined in the operation 55 that part of the candidate speeches include continuous identical phonemes, the speech recognition system may determine in operation 56 whether there is a silent interval equal to or greater than a threshold in the input speech.

If it is determined in the operation 56 that there is no silent interval equal to or greater than the threshold, the speech recognition system may re-calculate scores based on the degree of similarity of the length of each phoneme included in the input speech and the length of phonemes included in each of the candidate speeches, in operation 57. However, if the input speech is a numbering speech, the speech recognition system may re-calculate scores based on the degree of similarity of the length of each syllable included in the input speech and the length of syllables included in each of the candidate speeches.

Figure 7:
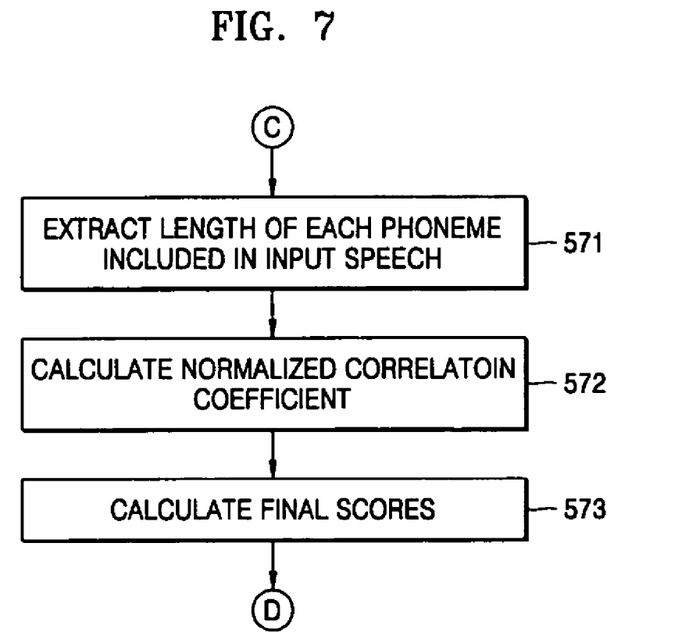
FIG. 7 illustrates operation 57 shown in FIG. 5, according to an embodiment of the present invention.

FIG. 7 illustrates operation 57 shown in FIG. 5, according to an embodiment of the present invention.

Here, in operation 571, the speech recognition system may extract the length of each of the phonemes included in the input speech. However, if the input speech is a numbering speech, the speech recognition system may extract the length of each of the syllables included in the input speech.

In operation 572, the speech recognition system may calculate normalized correlation coefficients indicating the degree of similarity of the length of each of the phonemes extracted in the operation 571 and the mean length of each phoneme included in each candidate speech. However, if the input speech is a numbering speech, the speech recognition system may calculate normalized correlation coefficients indicating the degree of similarity of the length of each of the syllables extracted in the operation 571 and the mean length of each syllable included in each candidate speech.

In operation 573, the speech recognition system may calculate final scores by using the normalized correlation coefficients calculated in the operation 572 and the weights calculated in the operation 52, for example.

Referring again to FIG. 5, in operation 58, the speech recognition system may determine a speech model having the highest score among the scores calculated in the operations 54 and 572 to be the recognized speech for the input speech.

Figure 8:
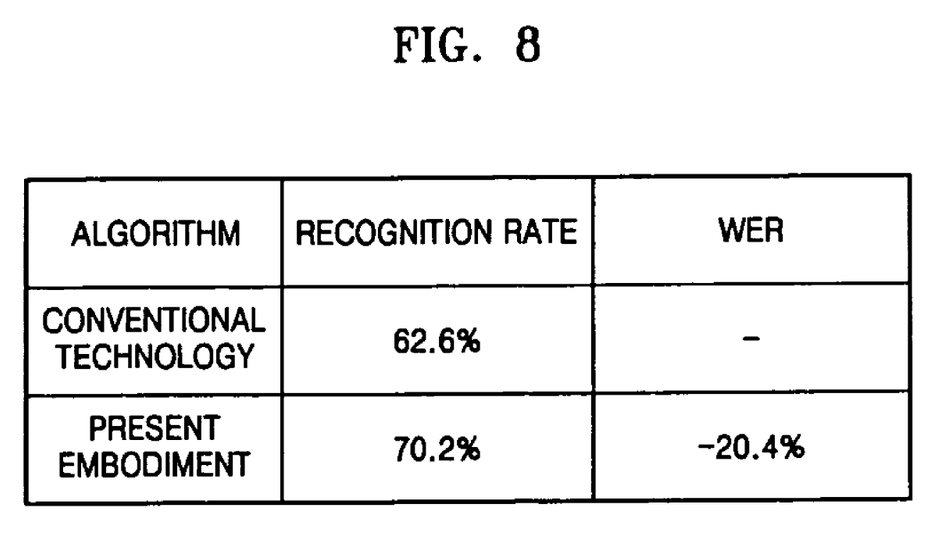
FIG. 8 illustrates test results in the speech recognition system, according to an embodiment of the present invention.

FIG. 8 illustrates test results in a speech recognition system, such as that shown in FIG. 1, according to an embodiment of the present invention.

In the presented test, training speeches collected from 100 persons were used to train the speech recognition system and 478 input speeches, spoken by 12 persons and including "ee ee" and "o o (55)", were tested. Also, in the presented test, a 39th order MFCC characteristic vector was used as the characteristic vector of speeches. The 39th order MFCC characteristic vector may be formed with 12th order MFCC coefficients, 12th order delta MFCC coefficients, 12th order delta-delta MFCC coefficients, energy coefficients, delta energy coefficients, and delta-delta energy coefficients.

Also, in the presented test, the structure of each numbering speech was 7 heads, 1 body, and 7 tails, totaling 15, and the number of the types of numbering speech was 11 (0~9, 0). As a result, the present tested used 167 (15×11+2=167) head body tail (HBT) continuous HMM (HMM) models, including 2 silent models, as training models. Also, in the presented test, by distinguishing male and female, a total 332 (15×11×2+ 2=332) speech models, including 2 silent models that have no relation with sex, were generated.

Referring to FIG. 8, in the presented test, the recognition rate of a embodiment of the present invention rose up to 70.2%, compared with 62.6% for the conventional system. In particular, when the input speech included continuous identical phonemes, a word error rate (WER) of a present embodiment decreased by 20.4% from that of a conventional system.

Meanwhile, embodiments of the present invention can be implemented through computer readable code, e.g., computer programs and/or instructions, and can be implemented in general-use digital computers for implementing the computer readable code, e.g., with the computer readable code being included with a medium, e.g., a computer readable recording medium. Examples of such media include magnetic storage media (e.g., ROM, floppy disks, hard disks, etc.), optical recording media (e.g., CD-ROMs, or DVDs), and storage media such as carrier waves (e.g., transmission through the Internet), for example.

Thus, according to embodiments of the present invention, by recognizing a speech based on a degree of similarity of length of each phoneme included in the input speech and a mean length of phonemes included in each speech model, the speech recognition rate can become very high, and, in particular, when the input speech includes continuous identical phonemes, WER is greatly reduced.

Further, according to embodiments of the present invention, without using the absolute length of each phoneme, speech may be recognized based on the degree of relative similarity of the length of each phoneme and the mean length of these phonemes. Accordingly, the speech speed of a speaker can be flexibly supported by embodiments of the present invention, and as a result, a clear watermark can be obtained. For example, the recognition rates of languages containing many continuous identical syllables, such as Korean numbering speeches, can be greatly improved.

Accordingly, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A speech recognition method, comprising:
calculating, using at least one computer, scores indicating a degree of similarity between a character of an input speech and characteristics of speech models, of a plurality of speech models, based on a degree of similarity between extracted lengths of phonemes included in the input speech and known lengths of phonemes included in the speech models; and
indicating a speech model having a high score among the calculated scores as being a speech model matching the input speech.

2. The speech recognition method of claim 1, wherein the high score is a highest score among the calculated scores.

3. The method of claim 1, further comprising:
calculating the scores by using the characteristic of the input speech and each corresponding characteristic of the speech models,
wherein, in the calculating of the scores indicating the degree of similarity, the calculated scores are re-calculated by using the calculated scores as calculated by using the characteristic of the input speech and each of the corresponding characteristics.

4. The method of claim 3, wherein, in the calculating of the scores indicating the degree of similarity, if among candidate speeches having a score higher than a predetermined rank among the scores calculated by using the characteristic of the input speech and each of the corresponding characteristics, some candidate speeches have continuous identical phonemes, the calculated scores are re-calculated based on a degree of similarity of a length of each phoneme included in the input speech with a length of phonemes included in each candidate speech.

5. The method of claim 4, wherein in the calculating of the scores by using the characteristic of the input speech and each of the corresponding characteristics, the scores are calculated based on a hidden Markov model (HMM).

6. The method of claim 4, further comprising:
extracting a characteristic vector having Mel Frequency Cepstral Coefficients (MFCC) of the input speech as components,
wherein in the calculating of the scores by using the characteristic of the input speech and each of the corresponding characteristics, the scores are calculated by using the characteristic vector of the input speech and a characteristic vector for each of the speech models.

7. The method of claim 1, wherein, if the input speech is a numbering speech, in the calculating of the scores indicating the degree of similarity, scores indicating the degree of similarity between the characteristic of an input speech and the characteristics of the speech models are alternatively calculated based on a degree of similarity between lengths of syllables included in the input speech and lengths of syllables included in the speech models.

8. The method of claim 1, wherein, in the calculating of the scores by using the characteristic of the input speech and each of the corresponding characteristics, the scores are calculated based on a consideration of whether a respective phoneme in the input speech may represent at least two separate contiguous phonemes.

9. The method of claim 1, wherein the degree of similarity is determined based on a correlation between respective lengths of each of the phonemes included in the input speech and respective lengths of each of the phonemes included in the speech models.

10. A speech recognition apparatus, comprising:
a score calculation unit to calculate scores indicating a degree of similarity between a characteristic of an input speech and characteristics of speech models, of a plurality of speech models, based on a degree of similarity between extracted lengths of phonemes included in the input speech and known lengths of phonemes included in the speech models; and
a recognized speech calculation unit to identify a speech model having a high score among the calculated scores as a speech model matching the input speech.

11. The speech recognition apparatus of claim 10, wherein the high score is a highest score among the calculated scores.

12. A computer readable recording medium comprising computer readable code to implement a speech recognition method, wherein the speech recognition method comprises:
calculating scores indicating a degree of similarity between a characteristic of an input speech and characteristics of speech models, of a plurality of speech models, based on a degree of similarity between extracted lengths of phonemes included in the input speech and known lengths of phonemes included in the speech models; and
indicating a speech model, of the plurality of speech models, having a high score among the calculated scores as being a speech model matching the input speech.

13. The medium of claim 12, wherein the high score is a highest score among the calculated scores.

14. A method for calculating a score, comprising:
calculating, using at least one computer, correlation coefficients indicating a degree of similarity between extracted lengths of phonemes included in an input speech and known lengths of phonemes included in candidate speeches, of a plurality of candidate speeches; and
calculating and outputting scores indicating a degree of similarity of a characteristic of the input speech and characteristics of the candidate speeches based on the calculated correlation coefficients.

15. The method of claim 14, wherein, in the calculating of the correlation coefficients, the correlation coefficients are calculated by referring to context information before and after each phoneme included in the input speech.

16. The method of claim 14, wherein, in the calculating of the scores indicating the degree of similarity, the scores are calculated based on weights, which are based on a test result of the scores, together with the correlation coefficients.

17. The method of claim 16, wherein, in the calculating of the scores indicating the degree of similarity, scores are calculated by adding a score based on a HMM model and a product of a weight of the score based on the HMM model and a difference between a predetermined value and a correlation coefficient.

18. The method of claim 14, wherein, in the calculating of the correlation coefficients, the correlation coefficients are calculated based on lengths of all phonemes included in the input speech and lengths of all phonemes in each of the candidate speeches.

19. The method of claim 14, wherein, in the calculating of the correlation coefficients, the correlation coefficients are calculated based on lengths of a core phoneme included in the input speech and a phoneme before the core phoneme, and lengths of continuous identical phonemes included in part of the candidate speeches and a phoneme before the continuous identical phonemes, with the core phoneme being a phoneme presumed to be identical to the continuous identical phonemes.

20. The method of claim 14, wherein, in the calculating of the correlation coefficients, the correlation coefficients are calculated based on lengths of a core phoneme included in the input speech and a phoneme after the core phoneme, and lengths of continuous identical phonemes included in part of the candidate speeches and a phoneme after the continuous identical phonemes, with the core phoneme being a phoneme presumed to be identical to the continuous identical phonemes.

21. The method of claim 14, wherein, in the calculating of the correlation coefficients, the correlation coefficients are calculated based on lengths of a core phoneme included in the input speech and phonemes before and after the core phoneme, and lengths of continuous identical phonemes included in part of the candidate speeches and phonemes before and after the continuous identical phonemes, with the core phoneme being a phoneme presumed to be identical to the continuous identical phonemes.

22. The method of claim 14, wherein the correlation coefficient is a normalized correlation coefficient of a length vector having lengths of respective phonemes included in the input speech, as components, and length vectors having lengths of respective phonemes included in each of the candidate speeches, as components, and a normalized correlation calculation unit calculates the normalized correlation coefficient by dividing a scalar product of the length vector of the input speech and a length vector of each candidate speech by a product of a length vector size of the input speech and a length vector size of each candidate speech.

23. The method of claim 14, wherein, if the input speech is a numbering speech, in the calculating of the correlation coefficients the correlation coefficients alternatively indicate a degree of similarity of lengths of syllables included in the input speech and lengths of syllables included in the candidate speeches.

24. An apparatus for calculating a score comprising:
a correlation coefficient calculation unit to calculate correlation coefficients indicating a degree of similarity between extracted lengths of phonemes included in an input speech and known lengths of phonemes included in candidate speeches, of a plurality of speeches; and
a score calculation unit to calculate scores indicating a degree of similarity of a characteristic of the input speech and characteristics of the candidate speeches based on the calculated correlation coefficients.

25. A computer readable recording medium comprising computer readable code to implement a score calculation method, wherein the score calculation method comprises:

calculating correlation coefficients indicating a degree of similarity between extracted lengths of phonemes included in an input speech and known lengths of phonemes included in candidate speeches, of a plurality of candidate speeches; and calculating and outputting scores indicating a degree of similarity of a characteristic of the input speech and characteristics of the candidate speeches based on the calculated correlation coefficients.

26. A speech recognition apparatus, comprising:

a score calculation unit to implement the method of claim 14 to calculate scores for speech models, of a plurality of speech models; and a recognized speech calculation unit to identify a speech model having a high score among the calculated scores as a speech model matching an input speech.

* * * * *

UNITED STATES PATENT AND TRADEMARK OFFICE
CERTIFICATE OF CORRECTION

PATENT NO. : 7,684,986 B2  Page 1 of 1
APPLICATION NO. : 11/315182
DATED : March 23, 2010
INVENTOR(S) : Icksang Han et al.

It is certified that error appears in the above-identified patent and that said Letters Patent is hereby corrected as shown below:

Column 12, Line 27, change "character" to --characteristic--.

Signed and Sealed this

Eighth Day of June, 2010

David J. Kappos
*Director of the United States Patent and Trademark Office*